T. BRABSON.
VALVE.
APPLICATION FILED FEB. 25, 1919.
1,423,178.
Patented July 18, 1922.
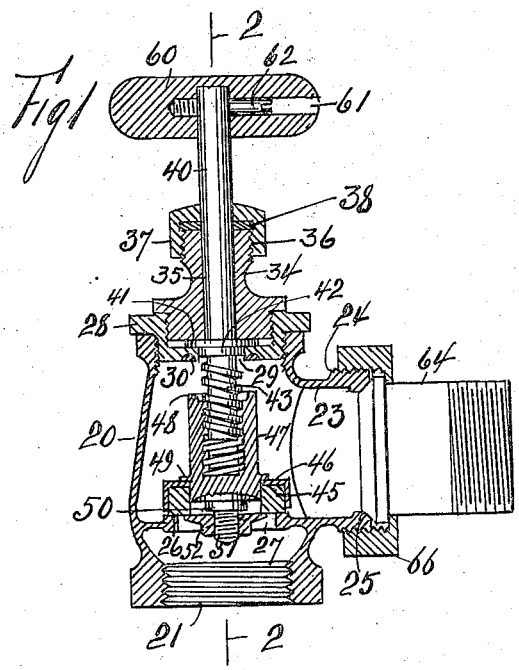
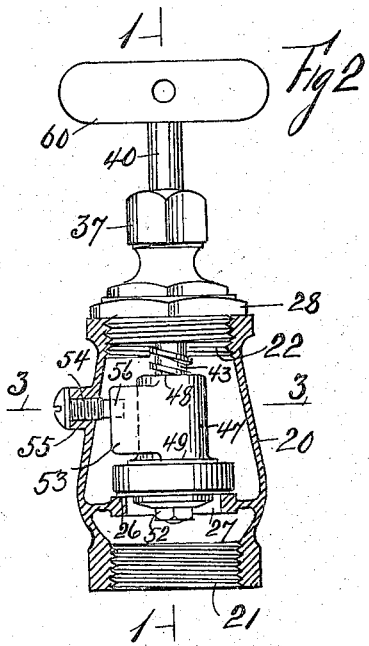
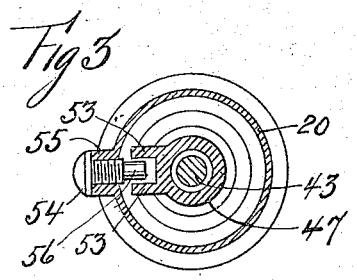
INVENTOR
Tom Brabson
BY
ATTORNEY

UNITED STATES PATENT OFFICE.

TOM BRABSON, OF BROOKLYN, NEW YORK.

VALVE.

1,423,178.　　　Specification of Letters Patent.　　Patented July 18, 1922.

Application filed February 25, 1919. Serial No. 279,122.

*To all whom it may concern:*

Be it known that I, TOM BRABSON, a citizen of the United States, and a resident of the borough of Brooklyn, in the county of Kings and State of New York, have invented certain new and useful Improvements in a Valve, of which the following is a specification.

This invention relates to a valve, and its novelty is characterized by means in its casing to prevent leakage around and about its valve spindle when the valve is raised off of its seat.

The valve spindle is also provided with a stuffing box which prevents leakage from the valve casing when the other leak preventive means are out of action, or the valve in the casing is raised off of its seat.

In the accompanying drawings which exemplify one form of the valve Fig. 1 represents a partial section of Fig. 2 on the line 1, 1; Fig. 2 shows a partial section of Fig. 1 on the line 2, 2 and Fig. 3 is a partial section of Fig. 2 on the line 3, 3.

A valve body or casing 20 has formed therewith the lower threaded opening 21, the upper threaded opening 22 and the side extension 23 exteriorly threaded at 24 having formed therewith the seat 25.

A valve seat 26 with the port 27 is formed with the casing 20.

A cover or cup shaped bushing 28 has formed therewith an exterior thread and an interior thread. The exterior thread is in threaded engagement with the opening 22, and has formed therein the central opening 29. A groove in the bottom face of the bushing 28 carries an annular seat 30 of soft metal.

A cap 34 with an axial opening 35 has formed at its lower end a thread which is in threaded engagement with the interior thread of the bushing 28. The cap 34 is also exteriorly threaded at 36. A cap nut 37 engages the threads 36 and maintains the valve spindle packing 38 in place. The cap nut 37 forms a stuffing box for the cap 34.

A valve spindle 40 is located in the opening 35 of the cap 34 and has formed therewith the disc flange 41 and the guide collar 42. Below the collar 42 is formed the left hand threaded portion 43. A valve 45 for the valve seat 26 is covered with the cap 46. A cylindrical suspended support 47 is interiorly threaded and is in engagement with the threaded portion 43 only. The support 47 enters an axial opening in the cap 46 and the valve 45. An annular shoulder 48 is formed at the top end of the support 47 and a flange 49 extends from its outer surface. A collar 50 extends from the lower end of the support 47 and a threaded portion 51 extends from the collar 50. A nut 52 in threaded engagement with the threaded portion 51 bears against the valve 45 and clamps the latter and the support 47 together. A pair of guide lugs 53 extend from the support 47. A guide screw 54 engages a threaded boss 55 extending from the valve casing 20 and has formed therewith a shank 56 which is located between the guide lugs 53.

A disc handle 60 is supported and connected to the valve spindle 40. An opening 61 is formed in the handle 60. A screw 62 in said opening is in threaded engagement with the valve spindle 40 and its threaded end is also screwed into the body portion of the handle 60. A union is indicated with the male portion 64 having the head 65 that rests on the seat 25. A cap nut 66 maintains the male portion 64 in place.

The valve is shown in the drawings in its closed position seated on the valve seat 26 closing the port 27. To open the valve the operator turns the disc handle 60 and the threaded portion 43 of the valve spindle 40 engages the threads of the cylindrical support 47, raises the latter and thereby the valve 45 is raised from its seat 26 without rotating. While the valve 45 is being raised the packing 38 prevents any leakage from the casing 20. The support 47 rises until the annular shoulder 48 is seated against the annular seat 30 and thereby the casing 20 is completely sealed from the escape of steam.

While the cylindrical support 47 is moving vertically the shank 56 of the screw 54 is located between the guide lugs 53 and the said support 47 is prevented from turning. The disc flange 41 bearing between the lower face of the cap 34 and the adjoining face of the bushing 28 prevents any vertical displacement of the valve spindle 40.

The support 47 is practically suspended from the threaded portion 43 of the valve spindle 40. Clearance space is provided between the inner faces of the lugs 53 and the shank 56 of the screw 54. By means of the suspension of the support 47 and the said clearance space the support 47 is constituted a floating support and thereby its shoulder 48 effectively seats itself on the seat 30 when said support is at the upper end of its stroke and likewise the valve 45 effectively seats itself on the valve seat 26.

When the connection between the threaded portion 43 and the interior thread of the support 47 becomes worn and with a resultant lost motion, the efficiency of the sealing means at the seat 30 and the engagement of the valve with its seat increases on account of the greater range of the floating function of the said support 47.

Having described my invention what I desire to secure by Letters Patent and claim is:

The combination of a valve casing having a valve seat with a port, a cup shaped bushing having a central opening and an interior and an outer thread, the latter thread in engagement with the upper end of the casing, a cap with a thread at its upper end and a thread at its lower end, the latter thread engaging the interior thread of said bushing, a cap nut for the thread at the upper end of the cap, a valve spindle extending through said cap and bushing and having a threaded portion at its lower end, said valve spindle having a disc flange and collar formed therewith, said disc flange held in place between said cap and bushing and said collar extending into the central opening of the bushing, a floating support having a pair of guide lugs and in threaded engagement with the threaded portion of the valve spindle and having a shoulder formed at its upper end, and a valve at its other end, the shoulder at the upper end of the support bearing against the lower face of said bushing when said support is in its uppermost position and an element coacting with the guide lugs of the support to maintain it in operative position, the said guide lugs separated from said element by clearance spaces.

Signed at the borough of Brooklyn, in the county of Kings and State of New York, this 13th day of February, A. D. 1919.

TOM BRABSON.

Witnesses:
A. A. DE BONNEVILLE,
WILMINA H. FRACE.